May 26, 1931. W. R. DEGENHARDT ET AL 1,806,792
ROCK ABRADING MACHINE
Original Filed Jan. 7, 1929  2 Sheets-Sheet 2

Inventors:
William Russell Degenhardt
and
Allan Fred de Fraine
By
Pennie Davis Marvin & Edmonds
attorney Patented May 26, 1931

1,806,792

UNITED STATES PATENT OFFICE

WILLIAM RUSSELL DEGENHARDT, OF LONDON, AND ALLAN FRED DE FRAINE, OF WEMBLEY, ENGLAND, ASSIGNORS TO THE FRANCOIS CEMENTATION COMPANY, LIMITED, OF DONCASTER, ENGLAND, A BRITISH COMPANY

ROCK ABRADING MACHINE

Original application filed January 7, 1929, Serial No. 330,900, and in Great Britain January 23, 1928. Divided and this application filed June 13, 1930. Serial No. 460,946.

This invention relates to rock abrading machines for use in tunnelling or shaft boring operations and of the kind comprising a rotatable frame which carries, at different radial distances from the axis of the tunnel or shaft, several rotary members (herein termed tool heads) provided with a number of loosely pivoted abrading or chipping tools which during the rotation of the tool heads move outwards into their operative positions under the influence of centrifugal force.

According to the invention the several tool heads are arranged to rotate about different axes each of which is tangential to a circle struck from the axis of rotation of the rotatable frame carrying the said tool heads. The said rotatable frame and a motor for driving it may be carried by a platform which is moved forward as the work progresses and the tool heads may be rotated through suitable mechanism from another motor carried by the said platform.

In order that the said invention may be clearly understood and readily carried into effect, the same will now be described more fully with reference to the accompanying drawings, in which:—

Figure 1:
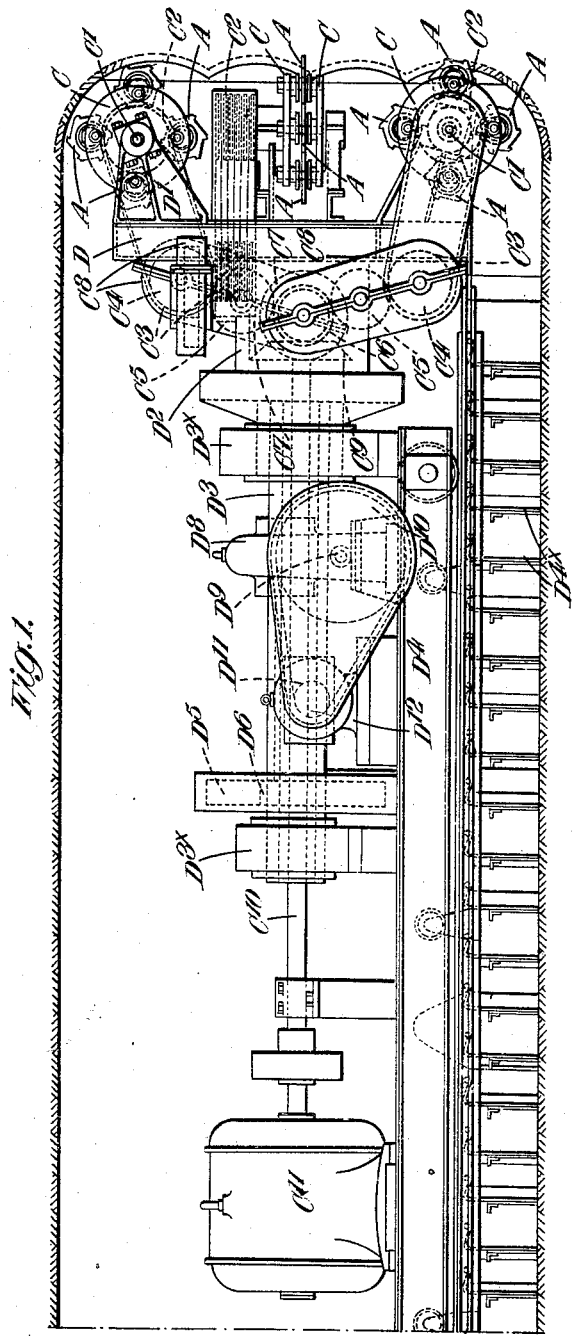
Figure 2:
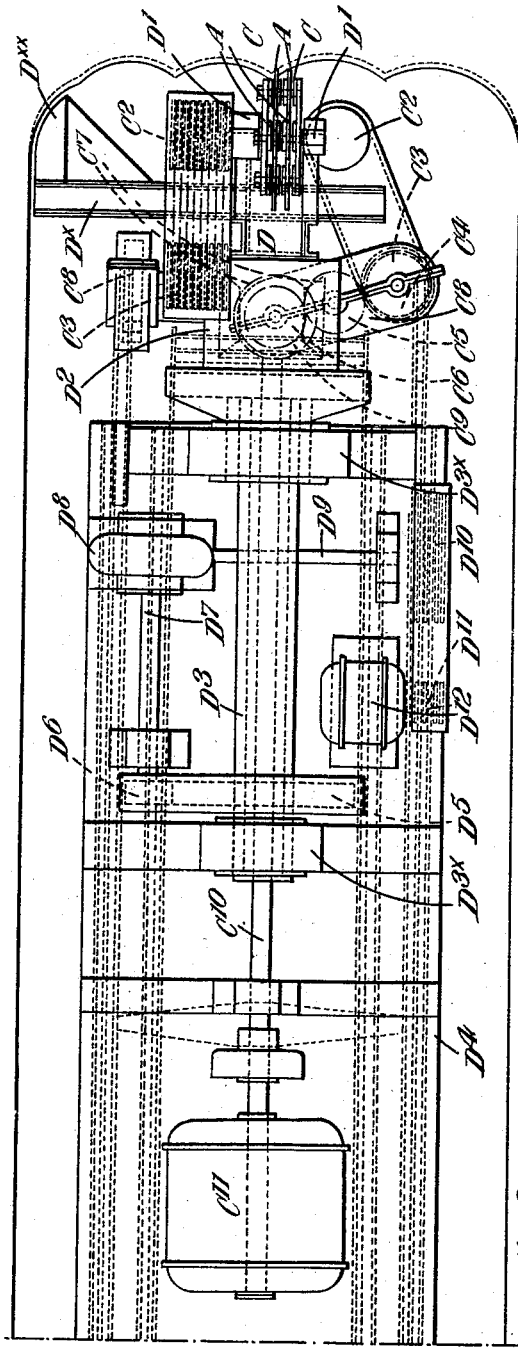
Figure 3:
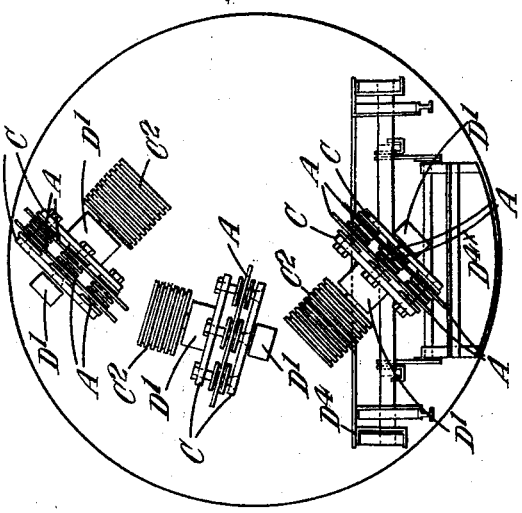

Figure 1 is a side elevation showing a constructional form of a machine in accordance with the invention, Figure 2 is a plan of Figure 1, and Figure 3 is a front view showing diagrammatically the disposition of the tool heads in the machine.

A, A are the tools which in the example shown are in the form of rings provided with large concentric holes through which pass pivot pins B carried by tool heads C as described in the specification of our concurrent patent application Serial No. 330,900, filed January 7, 1929, Patent No. 1,795,109, March 3, 1931, of which this application is a division. Each tool head is composed of discs spaced at suitable distances apart laterally with the tools A between them and the pivot pins B connected to the said discs near their peripheries. Each tool head is carried by a spindle C' the axis of which is parallel or substantially parallel to the axes of the pivot pins B.

In the example shown there are three tool heads C rotatably carried by brackets D' on a rotatable frame D at different distances from the axis of the tunnel so that when the said frame is rotated the tools A cover the whole face of the tunnel and produce grooves therein as shown in Figures 1 and 2. The tool heads rotate about different axes each of which is tangential to a circle struck from the axis of the frame D as shown in Figure 3. In the construction shown the tools of the tool heads that are at the greatest and the second greatest distance from the axis of the tunnel are arranged in pairs upon each pivot pin whilst the tools of the tool head that is nearest the axis of the tunnel are arranged singly on the pivot pins as they do not have to cover so much area as the others. The said frame D is connected to a large hollow boss $D^2$ (the purpose of which will be described later) and this in turn is connected to a hollow shaft $D^3$ rotatably mounted in brackets $D^{3\times}$ carried by a platform $D^4$ which is movable on rails on the floor of the tunnel so that the machine can be moved forward in any suitable manner as the work progresses. The said shaft carries a toothed wheel $D^5$ meshing with a pinion $D^6$ on a shaft $D^7$ also carried by the platform $D^4$. This shaft $D^7$ carries a wormwheel contained in a casing $D^8$ and the shaft $D^9$ of the worm that meshes with this wormwheel has a pulley $D^{10}$ connected by ropes to a pulley $D^{11}$ on the shaft of an electric motor $D^{12}$ carried by the platform $D^4$. Thus the said motor serves to rotate the frame D to carry the tools A over the face of the tunnel as aforesaid. The tool heads C are rotated in any suitable manner during the rotation of the frame D. In the example shown the spindle C' of each tool head C carries a pulley $C^2$ connected by ropes to a pulley $C^3$ the shaft of which carries a toothed wheel $C^4$. This toothed wheel meshes with an idler $C^5$ which in turn meshes with another toothed wheel $C^6$ the shaft of which carries a bevel wheel $C^7$. The toothed wheels $C^4$, $C^5$ and $C^6$ are arranged within a split casing $C^8$ connected to the aforesaid boss $D^2$. The three bevel wheels $C^7$ (one for each set of toothed wheels $C^4$, $C^5$, $C^6$) are arranged within the hollow boss $D^2$ and mesh with a common level wheel $C^9$ (also arranged within the hollow boss) on the front end of a shaft $C^{10}$ arranged within the aforesaid hollow shaft $D^3$. The rear end of the shaft $C^{10}$ where it projects beyond the shaft $D^3$ is connected to the shaft of an electric motor $C^{11}$ carried by the platform $D^4$. The rotation of the motor $C^{11}$ thus effects the simultaneous rotation of all the tool heads C. We would here mention that to avoid confusion in the drawings we have shown the tool heads C in Figure 1 in different relative positions from those in Figure 3 which shows the preferred disposition of the tool heads, and also that in Figure 2 only one tool head has been shown and this again in a position different from that of Figure 3. The frame D may be provided with a bar $D^x$ carrying at its end a scoop $D^{xx}$ for the purpose of clearing any partly loose débris from the upper wall of the tunnel and bringing it to the bottom of the tunnel where it can be transferred to the rear in any suitable manner such as by a reciprocating conveyor $D^{4x}$ of the pivoted pushplate type carried beneath the aforesaid platform $D^4$.

What we claim and desire to secure by Letters Patent of the United States is:—

1. A rock abrading machine for use in tunnelling or shaft boring operations, comprising a rotatable frame, a plurality of tool heads rotatably carried by said frame so as to rotate about axes which are tangential to circles having radii of different lengths, the said circles having as their common center the axis of rotation of said frame, and a number of loosely pivoted abrading or chipping tools carried by each of said tool heads, these tools during the rotation of the tool heads moving outwards into their operative positions under the influence of centrifugal force, and the said tools and tool heads being so arranged that the tools cover the whole working face of the tunnel during the rotation of said frame.

2. A rock abrading machine for use in tunnelling or shaft boring operations, comprising in combination with the elements claimed in claim 1, a platform carrying the rotatable frame, a motor carried by said platform for rotating said frame, a second motor carried by said platform and means whereby the tool heads are rotated from said second motor.

WILLIAM RUSSELL DEGENHARDT.
ALLAN FRED de FRAINE.